UNITED STATES PATENT OFFICE.

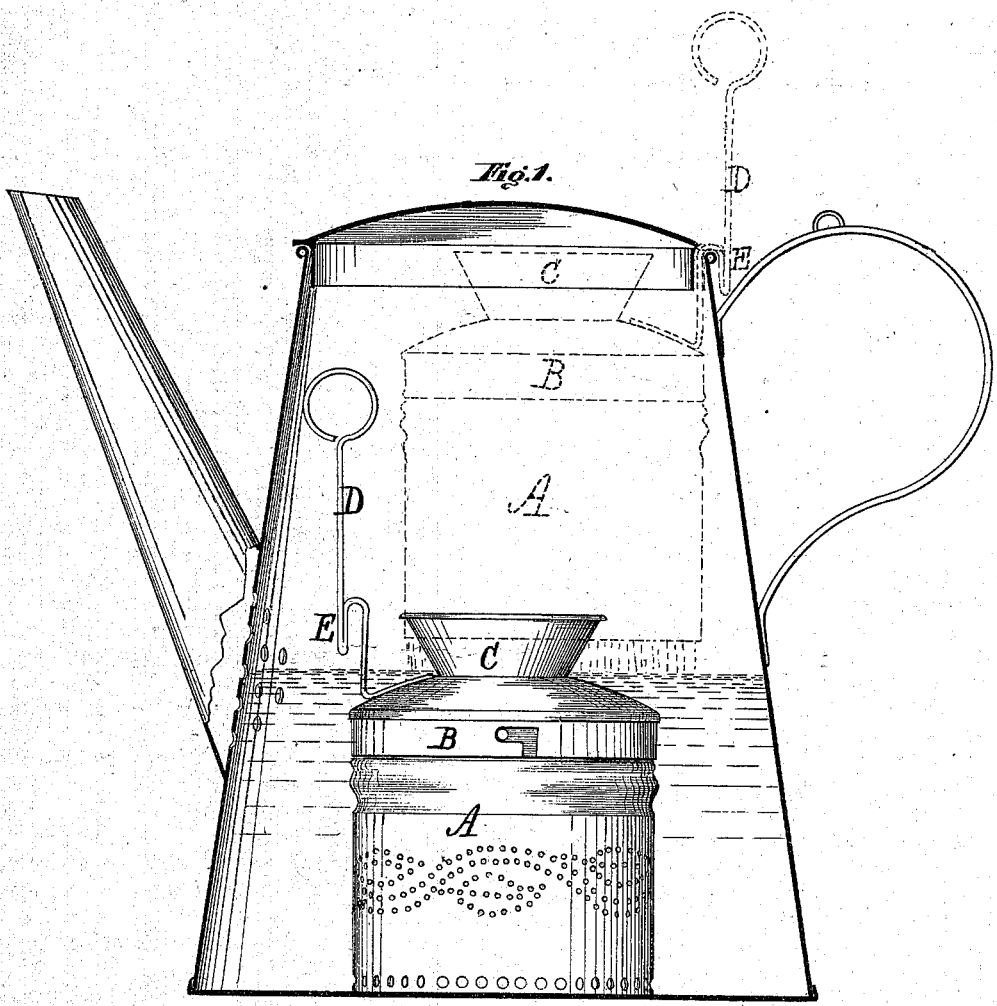

JOHN HEBERLING, OF MOUNT PLEASANT, OHIO.

IMPROVEMENT IN COFFEE-POTS.

Specification forming part of Letters Patent No. 115,467, dated May 30, 1871.

*To all whom it may concern:*

Be it known that I, JOHN HEBERLING, of Mount Pleasant, in the county of Jefferson and State of Ohio, have invented a new and useful Coffee Generator and Leacher; and I do hereby declare that the following is a full, clear, and exact description thereof, sufficient to enable those skilled in the art to which my invention appertains to make and use the same, reference being had to the accompanying drawing, in which—

Figure 1 represents a sectional view of a coffee-pot containing my improved coffee generator and leacher. Fig. 2 is a vertical section of my improvement.

The nature of my invention consists in a coffee generator and leacher provided with a handle formed with a hook so that it may rest upon the bottom of the coffee-pot or be suspended from the top, as may be desired.

The coffee-generator consists of a metallic vessel, A, having its sides and bottom perforated, and provided with a lid, B, which may be either made to fit tightly or be held in place by means of a pin and L-shaped slot, as shown in Fig. 1. Attached to the top of the lid B is a funnel, C, in the bottom of which is a screen of wire-gauze or perforated sheet metal. Attached to the top of the lid B, near the periphery, is a lifting-handle, D, which may be made of wire, or sheet metal, or both. The upper end of the handle D is bent so as to form a hook or ring, by means of which it may be readily lifted or hung up when not in use. A short distance above the top of the lid the handle D is bent so as to form a hook, E, corresponding with the thickness of the rim at the top of an ordinary coffee-pot, as shown in Fig. 1.

The ground coffee is placed in the generator, the lid secured, and the generator placed in the coffee-pot and covered with water, as shown in full lines in Fig. 1. As the water becomes heated it passes through the perforations, extracting the essence from the coffee, after which the generator may be suspended by the hook E from the top of the coffee-pot, as shown in dotted lines in Fig. 1, and allowed to drip, without interfering with the use of the coffee-pot.

When the generator is used as a leacher only, it is suspended from the top of the coffee-pot, as shown in dotted lines in Fig. 1, and the boiling water is poured through the funnel C in the desired quantity. The lid of the coffee-pot is then closed and the leacher remains suspended, as before described.

I do not claim, broadly, a perforated coffee-generator, as I am aware that such has been used before.

What I claim as new, and desire to secure by Letters Patent, is—

A coffee generator and leacher having its sides and bottom perforated and provided with a screen-bottomed funnel, C, and a lifting-handle, D, formed with a hook, E, all as herein shown and described.

JOHN HEBERLING.

Witnesses:
F. R. COOPER,
R. W. CHAMBERS.